March 11, 1941.  B. C. SKINNER ET AL  2,234,880

JUICE EXTRACTING MACHINE

Filed May 17, 1938  4 Sheets-Sheet 1

Inventors
B. C. Skinner
J. J. R. Bristow

March 11, 1941. B. C. SKINNER ET AL 2,234,880
JUICE EXTRACTING MACHINE
Filed May 17, 1938 4 Sheets-Sheet 2

Inventors
B. C. Skinner
J. J. R. Bristow
By Mason Fenwick & Lawrence
Attorneys

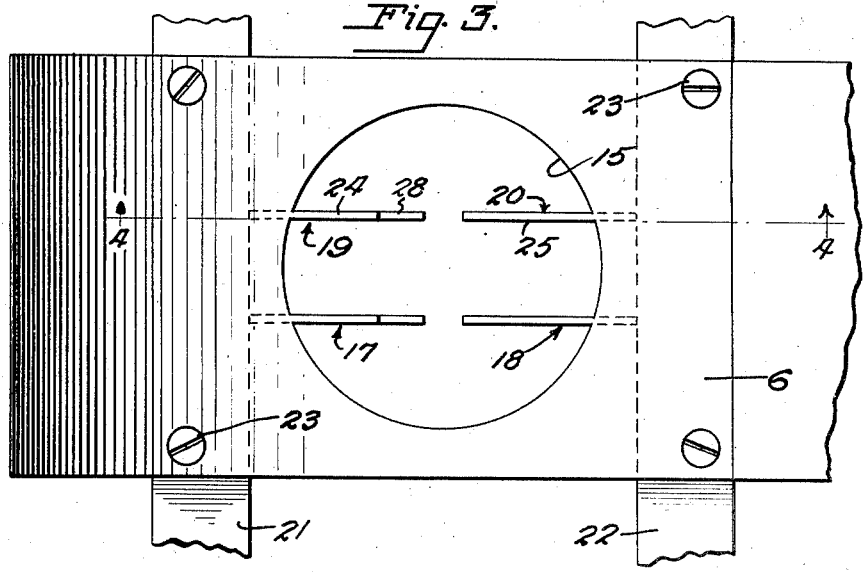
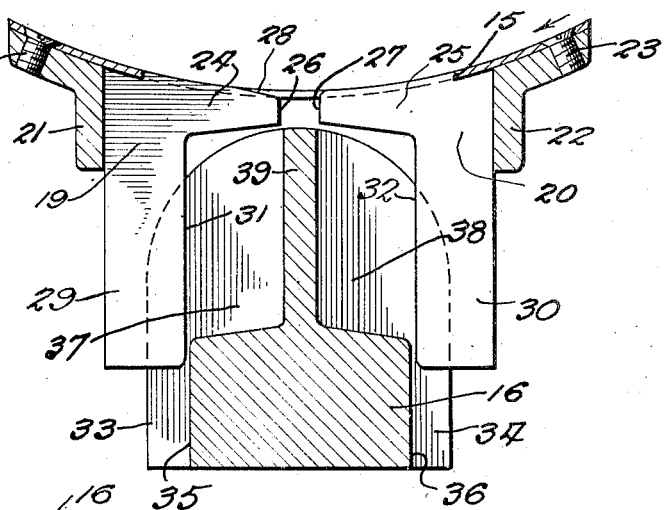
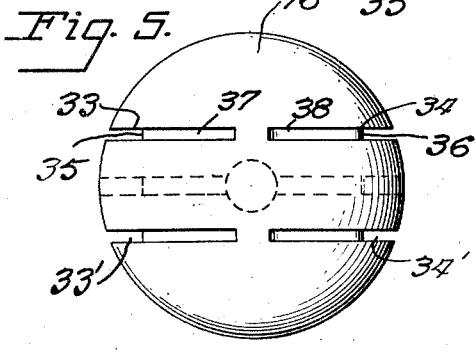

March 11, 1941.  B. C. SKINNER ET AL  2,234,880
JUICE EXTRACTING MACHINE
Filed May 17, 1938    4 Sheets-Sheet 4
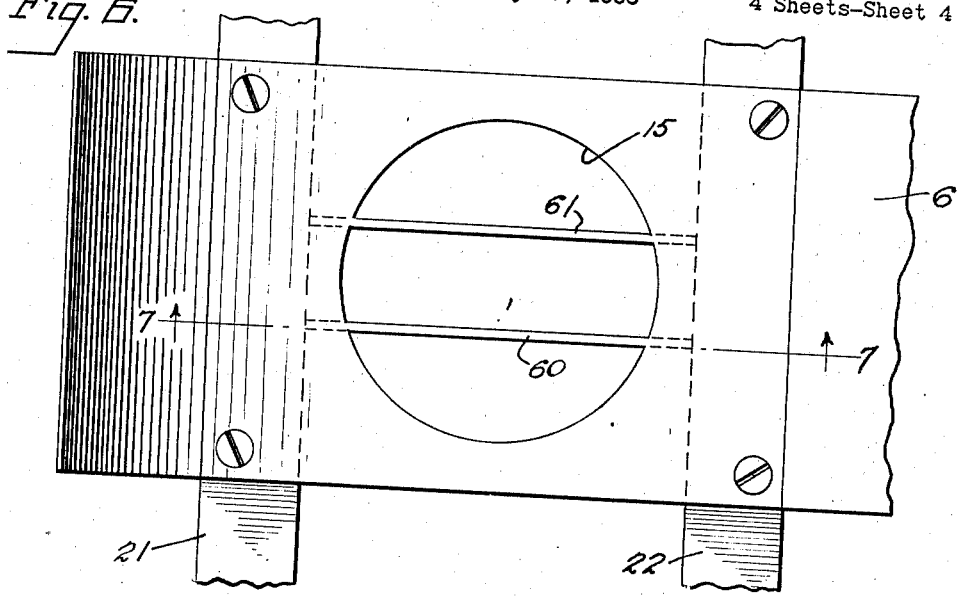
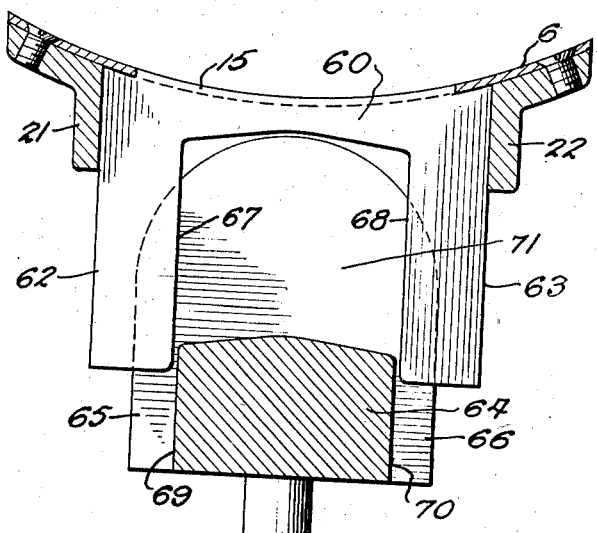
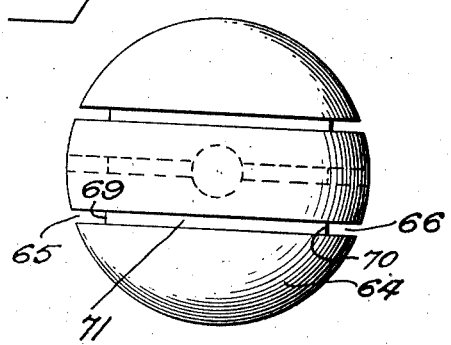
Inventors
B. C. Skinner
J. J. R. Bristow
By Mason, Fenwick & Lawrence
Attorneys

UNITED STATES PATENT OFFICE 2,234,880

JUICE EXTRACTING MACHINE

Bronson C. Skinner and James J. R. Bristow, Dunedin, Fla., assignors to Essential Oil Producers, Inc., Dunedin, Fla., a corporation of Florida Application May 17, 1938, Serial No. 208,472

3 Claims. (Cl. 100—40)

The invention forming the subject matter of this application is in the nature of an improvement in fruit juice extracting machines of the type illustrated in the United States Patent to Faulds, No. 2,065,271, December 22, 1936.

In the machine disclosed in said patent, fruits such as oranges, are cut in half. The halves are deposited in cups which are moved intermittently along a breast plate provided with openings adapted to permit the passage therethrough of presser heads reciprocable into and out of squeezing contact with the halves of fruit in said cups during one of their periods of rest. The breast plate holds the halves of fruit in the cups during their movement to predetermined juice extracting positions directly above said openings. To prevent the halves of fruit from falling through said openings, the latter are provided with shutters which extend into the openings to hold the halves of fruit in position to have the juice extracted. These shutters define openings which are smaller in diameter than the diameters of both breast plate openings and presser heads; and the shutters are constructed to yield in radially outward directions when the presser heads are reciprocated through the concentric breast plate and shutter openings.

It is the main object of the present invention to substitute for the shutter and presser head construction, just described, very simple fruit retaining structures which substantially bridge the aforesaid breast plate opening and at the same time form fixed guiding means for correspondingly modified presser heads in their reciprocating movements through said openings.

Other objects of the invention will become apparent as the detailed description thereof proceeds.

In the drawings:

Figure 3 is a fragmentary plan of the improved breast plate structure;

Figure 4 is a vertical section taken on the line 4—4 of Figure 3;

Figure 5 is a top plan view of a presser head forming part of the present invention;

Figure 6 is a fragmentary plan of a modified form of breast plate structure;

Figure 7 is a vertical section taken on the line 7—7 of Figure 6; and

Figure 8 is a top plan view of a presser head designed for use with the structure shown in Figures 6 and 7.

Figure 1:
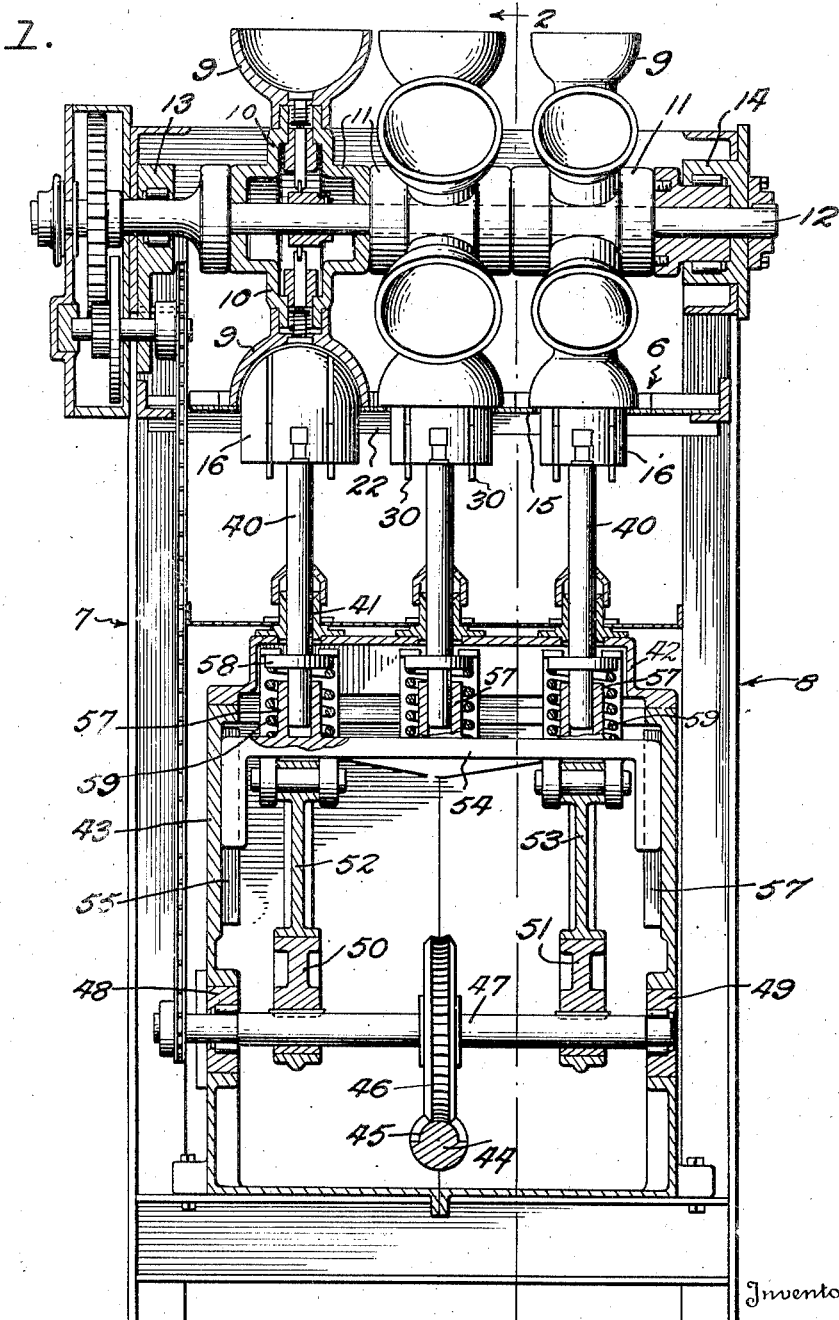
Figure 1 is a central vertical section through a preferred form of the invention.

The invention as shown in Figures 1 to 5 of the drawings, comprises a cylindrical breast plate 6 suitably secured between framed standards 7 and 8 forming parts of the supporting framework of the machine. The hemispherical fruit receiving cups 9 are suitably secured to spokes 10 extending radially from hubs 11, fixed to a shaft 12 coaxial with the breast plate 6 and journaled in bearings 13 and 14 mounted on the standards 7 and 8.

Figure 2:
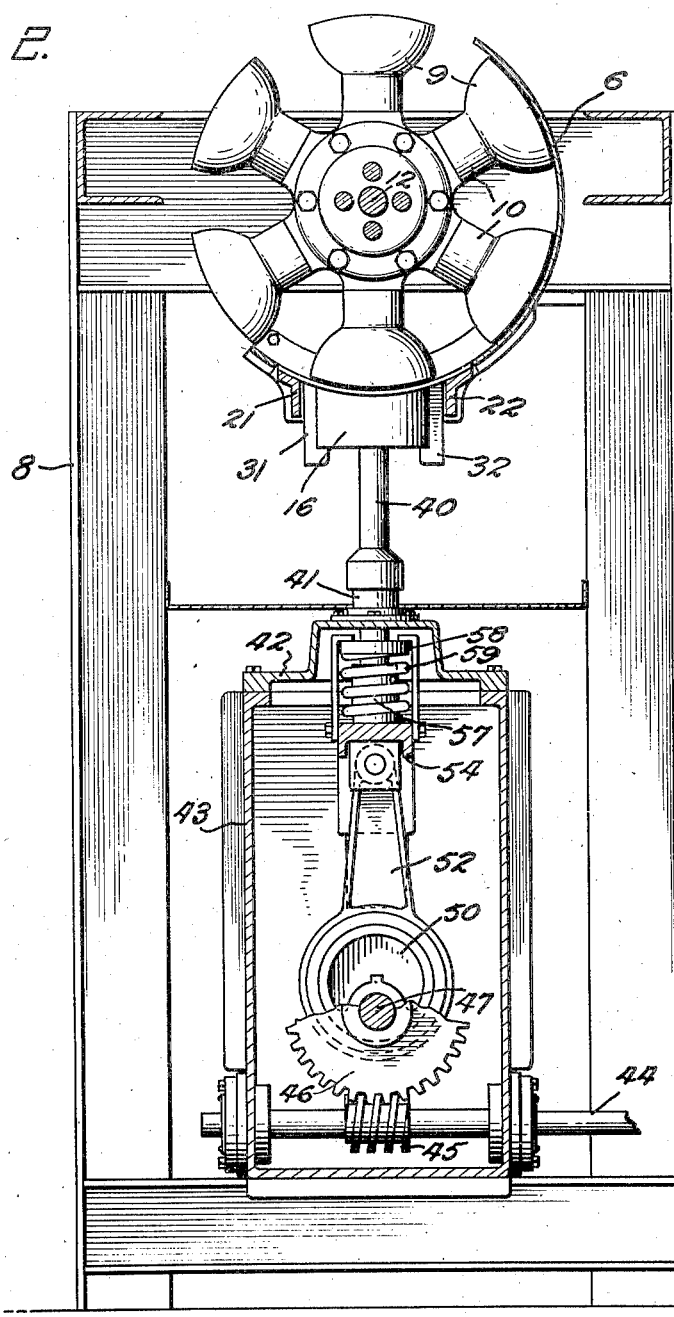
Figure 2 is a vertical section taken on the line 2—2 of Figure 1.

In their highest positions, as shown in Figures 1 and 2, the cups 9 receive the halves of fruit from cutting mechanism (not shown); and are moved by intermittent rotation of the shaft 12 along the inner surface of the breast plate 6 until each cup is successively located in inverted position directly above one of the openings 15 in the breast plate 6.

The openings 15 are preferably of the same diameter as the presser heads 16 which are mounted for reciprocation through said openings into and out of juice extracting contact with the halves of fruit held in the inverted cups 9. To hold these halves of fruit securely in the inverted cup and to prevent withdrawal thereof by the retracting movements of the presser heads, each opening is substantially bridged by two pairs of inverted L-shaped plates 17—18, 19—20.

These bridge plates are welded or otherwise suitably secured to the breast plate and to the cross struts 21 and 22 forming part of the supporting framework of the machine and to which the breast plate is also secured as by machine screws 23. The arms 24 and 25 of the plates 19 and 20 are of substantially the same length and their respective ends 26 and 27 terminate a short distance from each other on opposite sides of a diameter of the opening 15.

The cups 9 are assumed to move in the direction of the arrow shown in Figure 4, and the arcuate upper edges of the plates 19 and 20 are coaxial with the shaft 12 and breast plate 6. The entering end of the arm 24 is therefore bevelled as indicated at 28, to prevent the halves of fruit being caught on the corner of a plate as they are dragged by the cups across the openings 15.

The other arms 29 and 30 of the respective bridge plates 19 and 20 extend vertically downward in the machine, and have their opposed vertical edges 31 and 32 equi-distantly spaced from a vertical plane bisecting the opening 15 at right angles to the plane of the plates 19 and 20. These arms 29 and 30 have a sliding fit in slots 33 and 34 formed in the presser head 16; and their edges 31 and 32 are constantly in guiding contact with the bottom walls 35 and 36 of the said slots 33 and 34, respectively.

The slots 33 and 34 are continuations of recesses 37 and 38 separated to form a solid part 39 adapted to slide between the ends 26 and 27 of the opposed bridge plates 19 and 20. The recesses 37 and 38 are shaped to correspond to the shape of the recesses formed by the inner edges of the plates 19 and 20, to permit the presser heads 16 to extend through the breast plate openings 15 such distances as may be necessary to effect juice extracting pressure on the halves of fruit in the cups 9.

The other pair of plates 17 and 18 are similar in every respect to the plates 19 and 20, and are designed to form guides for the corresponding slots 33' and 34' formed in the presser head 16.

The invention is not to be considered as limited to the use of any particular number of pairs of bridging plates, since they may be arranged radially in any desired number. It is necessary, however, that the adjacent ends of the horizontal arms of each pair be separated sufficiently to permit the passage of the slotted presser heads through the openings 15 in the breast plate 6; and that the cooperating recesses formed by the slots in the presser heads and the arms of the bridging plates be shaped to ensure continuous guiding contact for the presser heads in their reciprocations through the openings 15.

The presser heads 16 are suitably secured to the upper ends of the rods 40 which extend slidably through sleeves 41 suitably secured to the top 42 of a gear casing 43 secured to and supported by the framework. A drive shaft 44 operated by any suitable source of power is connected by worm 45 and worm gear 46 to the shaft 47 journaled to rotate in the bearings 48 and 49 mounted on opposite walls of the casing 43.

A pair of circular eccentrics 50 and 51 are fixed to the shaft 47 on opposite sides of the gear 46, and are arranged to rotate in the cylindrical apertures formed in the lower ends of the pitmen 52 and 53, the upper ends of which are pivotally connected to a cross head 54. The opposite ends of the cross head 54 are slotted to receive and slide on the guide tongues 55 and 56 projecting inwardly from the opposite walls of the casing 43.

The upper edge of the cross head 54 has a series of bosses 57 formed thereon and bored to form sleeves for slidably receiving the lower ends of the rods 40, each of which has a flange 58 forming an abutment for one end of a compression spring 59 which surrounds the boss 57 and is supported by the upper edge of the cross head 54.

The shaft 12 upon which the cups 9 are mounted, is connected by suitable gearing for rotation by the shaft 47. As is usual in devices of this kind, continuous rotation of the shaft 47 is translated by suitable mechanism (not shown) into intermittent rotation of shaft 12, so that the cups 9 remain at rest over the openings 15 in the breast plate 6 while the presser heads 16 are being reciprocated through the openings 15 into and out of juice extracting contact with the fruit. The invention is not concerned with the details of the gearing for effecting this intermittent movement, since this gearing is old and in common use in the art. It is shown, for example, in the patent to Faulds, above referred to.

Any suitable mechanism for slicing the fruit into halves and for removing the skins and pulp from the machine may be employed in connection with the improved breast plates and presser heads, to which the present invention is limited.

In the modification shown in Figures 6, 7 and 8, the pairs of fruit supporting plates 17—18, 19—20, are replaced by the bridge plates 60 and 61, each of which extends clear across the opening 15 in the breast plate 6. These bridge plates are suitably secured, as by welding or otherwise, to the struts 21 and 22 of the framework.

Guide arms 62 and 63 extend downwardly from opposite ends of the plate 60, and are received slidably in guide slots 65 and 66, respectively, formed in a presser head 64. The inner edges 67 and 68 of the bridge plate 60 cooperate with the bottoms 69 and 70 of the slots 65 and 66 to guide the reciprocating presser head 64 accurately to and through the aperture 15 of the breast plate. The slots 65 and 66 merge into a slot 71 which extends clear across the presser head 64 to permit the latter to traverse the plate 60 during its reciprocation into and out of juice extracting position.

The bridge plate 61 is structurally the same in every respect as plate 60; and, the presser head is correspondingly slotted to receive the guide arms and central bridge part thereof.

The invention is not to be considered as limited to the exact forms of the breast plate and presser head construction shown and described.

What we claim is:

1. A fruit juice extractor having fruit holding cups and an apertured breast plate with fruit pressing head reciprocable through the aperture of the breast plate, bridge means secured to the under face of the breast plate for retaining a fruit portion in a cup over the aperture of the breast plate positioned so as to extend into the aperture with upper face substantially flush with the upper face of the breast plate.

2. The structure of claim 1 in which the bridge means includes a plurality of bridge members which are substantially L shaped, arranged in aligned pairs, and the presser head is provided with slots to receive said members.

3. The structure of claim 1 in which the bridge means comprises bridge members which are substantially L shaped, arranged in pairs aligned in the direction of movement of the cup, the upper edge of the member of each pair last contacted by the advancing fruit being bevelled and the pressure head being slotted to receive said bridge members.

BRONSON C. SKINNER.
JAMES J. R. BRISTOW.